(12) United States Patent
Kaoh

(10) Patent No.: US 8,826,572 B2
(45) Date of Patent: Sep. 9, 2014

(54) ADJUSTABLE ILLUMINATED LOTTERY SIGN

(76) Inventor: Andy K. F. Kaoh, Santa Ana, CA (US)

( * ) Notice: Subject to any disclaimer, the term of this patent is extended or adjusted under 35 U.S.C. 154(b) by 244 days.

(21) Appl. No.: 13/436,719

(22) Filed: Mar. 30, 2012

(65) Prior Publication Data
US 2013/0255116 A1    Oct. 3, 2013

(51) Int. Cl.
G09F 13/22    (2006.01)

(52) U.S. Cl.
CPC ..................................... G09F 13/22 (2013.01)
USPC .............................................. 40/544; 40/546

(58) Field of Classification Search
USPC ........................ 40/544, 546, 793, 779, 607.1
See application file for complete search history.

(56) References Cited

U.S. PATENT DOCUMENTS

| | | | |
|---|---|---|---|
| 5,061,921 A | 10/1991 | Lesko et al. | |
| 5,207,493 A | 5/1993 | Murase et al. | |
| 5,216,595 A | 6/1993 | Protheroe | |
| 5,283,968 A | 2/1994 | Williams | |
| 5,390,436 A | 2/1995 | Ashall | |
| 5,408,387 A | 4/1995 | Murase et al. | |
| 5,410,454 A | 4/1995 | Murase et al. | |
| 6,094,849 A | 8/2000 | Phillips et al. | |
| 6,121,875 A | 9/2000 | Hamm et al. | |
| 6,271,814 B1 * | 8/2001 | Kaoh | 345/82 |
| 6,481,130 B1 | 11/2002 | Wu | |
| 6,568,821 B1 | 5/2003 | Page et al. | |
| 6,729,057 B1 * | 5/2004 | Lu | 40/611.02 |
| 6,821,007 B1 | 11/2004 | Olman et al. | |
| 6,976,330 B2 | 12/2005 | Milliken | |
| 7,064,673 B1 | 6/2006 | Bonham | |
| 7,164,836 B2 | 1/2007 | Wright et al. | |
| 7,262,707 B2 | 8/2007 | Kaoh | |
| 7,262,708 B1 * | 8/2007 | Addicks | 340/815.63 |
| 7,273,308 B2 | 9/2007 | Spero et al. | |
| 7,547,251 B2 | 6/2009 | Walker et al. | |
| 7,572,045 B2 | 8/2009 | Hoelen et al. | |
| 7,627,497 B2 | 12/2009 | Szrek et al. | |
| 7,681,347 B1 | 3/2010 | Welker et al. | |
| 7,780,514 B2 | 8/2010 | Walker et al. | |
| 7,839,265 B2 | 11/2010 | Picard et al. | |
| 7,878,895 B2 | 2/2011 | Penrice | |
| 7,903,194 B2 | 3/2011 | Epstein et al. | |
| 7,941,269 B2 | 5/2011 | Laumeyer et al. | |
| 7,976,390 B2 | 7/2011 | Schneider et al. | |
| 8,103,550 B2 | 1/2012 | Tessitore et al. | |
| 8,128,473 B2 | 3/2012 | Finnochio | |
| 8,131,595 B2 | 3/2012 | Lee et al. | |
| 8,578,641 B2 * | 11/2013 | Suciu et al. | 40/658 |
| 2002/0121034 A1 * | 9/2002 | Schmitt | 40/604 |
| 2005/0246927 A1 * | 11/2005 | Krawinkel | 40/544 |
| 2008/0079538 A1 * | 4/2008 | Davis | 340/5.91 |
| 2009/0025264 A1 * | 1/2009 | Daimon et al. | 40/546 |
| 2010/0307041 A1 | 12/2010 | Tian et al. | |

* cited by examiner

Primary Examiner — Joanne Silbermann

(57) ABSTRACT

An illuminated sign having a housing unit with a frame and one or more light emitting arrays to provide visible indicia and a backlight module for mounting a transparent backlight panel which is held in close contact with a reflection panel and optically positions a light emitting unit to emit light through the backlight panel for emission from the front of the sign. The replaceable sign member accommodates the display of visible indicia and is backlit by the light emitting unit. A light sensor is mounted on the backlight module for measuring ambient light. The light emitting unit can be driven by a signal from the light sensor to automatically set a contrast level of illumination to optimize the information presented by the illuminated sign.

19 Claims, 6 Drawing Sheets

ADJUSTABLE ILLUMINATED LOTTERY SIGN

BACKGROUND OF THE INVENTION

1. Field of the Invention

The present invention is directed to a lottery display sign that can be wirelessly interconnected into a network for controlling a display and is adjustable to not only accommodate different static graphic images and illuminated numerical displays of potential payoffs and variable related information but to also automatically adjust luminance contrast of the sign to its environment.

2. Description of Related Art

Display signs that have been used in casinos and in retail outlets for providing information relating to game play or a lottery payoff are known. With regards to slot machines utilized in a casino, an electronic adjustment of the potential jackpot is frequently utilized to inform the player of the value of a possible win and to create excitement on a casino floor to encourage players to invest their money based on an illuminated potential jackpot.

Illuminated signs are also utilized to display potential lottery winnings, for example as sponsored by various states and made available in various commercial outlets such as convenience stores. As with the casino slot machines, there is a necessity to change the value of a potential lottery jackpot based on the total prior value of the lottery tickets that are purchased.

LED signs composed in a seven segment array are known to be able to provide a value from 1-9 and 0 by selective activation of the individual segments.

In order to provide illuminated signs of a compact configuration, there have been attempts to provide strips of LEDs to permit a compact edge lit signage.

In such an environment there is still a need to provide a compact lightweight adjustable illuminated lottery sign that can maximize the advertisement capabilities in a compact configuration that will support additional functional features while accurately enabling an updating of the potential jackpot to the consumer. Such an illuminated sign should be easily manufactured and capable of various forms of display.

SUMMARY OF THE INVENTION

It is desirable that the lottery signs not only be accurate to prevent any disputes on the value of the tickets sold, but also to be relatively compact so that the lottery signs can be conveniently placed adjacent both cash registers and/or displayed in the window of commercial establishments.

It is desirable to further provide additional information in an adjacent display area that can direct the consumer's attention to the current lottery value. Additionally, there are frequently different daily, weekly and other types of lottery games that can be made available.

It would be an advantage to enable a lottery sign to be able to accommodate different lottery games on the same display sign. It is also desirable to draw attention to such auxiliary information by illuminating the signage while also permitting the signage to be changed without requiring an entirely new illuminated sign.

The present invention provides an illuminated sign having a compact housing unit of a lightweight and thin configuration. A light illuminating unit, such as a replaceable backlight module, can be mounted on the housing unit to emit light across at least a first side of the housing unit and to permit a relatively easy replacement of any lighting elements that may fail.

A transparent backlight panel can extend across the first side of the housing unit and be optically connected to emitted light from a light emitting unit. The light emitting unit can be removably mounted across one edge of the transparent backlight panel. A reflection section, for example, having an array of reflection sites, is positioned directly against the transparent backlight panel to operatively engage the optical paths of the light rays emitted from the light emitting unit in order to redirect the light from the light emitting unit outward through the transparent backlight panel to a viewer. A replaceable light transmissive sign or graphic member is configured to be backlit by the light emitting unit, such as a strip of light emitting diodes, and to be mounted easily onto and removed from the housing unit.

One or more light emitting arrays can additionally provide visible indicia to the user, for example, indicating the numerical value of a lottery jackpot. The replaceable sign member can be configured to accommodate a frontal display of any visible indicia from one or more light emitting arrays mounted in the housing unit.

Additionally, a modified form of the present invention can also incorporate a scrolling message sign unit wherein a visible message can be scrolled across the illuminated sign to provide additional information or to attract attention by displaying sports scores or topic news events. The replaceable sign member would also be configured to accommodate the display of this scrolling information while presenting static images at appropriate adjacent locations on the display sign.

The replaceable sign member can be secured by an over center bias panel unit that is mounted by a hinge connector across a surface of the housing unit. Accordingly, different replaceable sign members, for example on flexible plastic sheets, can be mounted on the housing unit and appropriately secured flat against the transparent backlight panel by the same removable backlight module.

A light sensor assembly for measuring ambient light in the environment of a location of the illuminated sign can measure and provide an output signal to automatically adjust an output of light from the light emitting unit to provide a predetermined contrast with the ambient light. A control unit processor can set drive voltages to activate the light emitting unit based on the output signals and predetermined values and associated with the processor.

The light sensor output can be processed to automatically provide a control of the brightness of the backlight panel and/or also an array of light emitting diodes (LEDs) to provide numerical values of a jackpot. For example, a day and night level of luminous flux for daylight and for nighttime can be provided by an automatic activation by the control unit processor mounted in the sign.

Alternatively, a more precise control of multiple levels of luminous flux can be provided by storing a correlation between measured Lux by a photo sensor with a specific drive voltage for both an edge strip of LEDs to a backlight panel and one or more light emitting arrays for providing visible indicia such as numerical digital values.

The illuminated sign can include a wireless transceiver or a wired transceiver for receiving electronic data, including values of the lottery jackpot for updating the display of the numerical value under the control of a control processor at the headquarters of the Lottery. The transceiver can also receive communication data for driving indicia across the scrolling message sign unit.

Thus, a wireless update of jackpot sums, an on, off and/or a panel flashing, a brightening or dimming of digits, a light pattern of chasing borders around a digital display and even stock quotes on an EMC message board can be provided by a wireless link, as examples that can be centrally controlled to provide uniform information at each retail outlet.

Alternatively, an EPROM can store operation data which can be either manually updated or could be updated using an RJ 11 RS 232 port on the illuminated sign housing.

A rear side over center bias panel mounted by a hinge connector is also capable of mounting a replaceable graphic sign member on the rear side of the sign, for example, when the front of the sign is mounted within an exterior display window.

The housing unit can include a pair of rotatable stand members that facilitate a stable support of the illuminated sign on a horizontal support surface while permitting the stand members to be retracted when the illuminated sign is hung from a wall or in a display window.

A user input for varying the controls of the illuminated sign and the indicia to be displayed can also be incorporated as either a wireless input unit or a wired input unit for entering data into the processor.

A backlight module for lighting the removable sign member or graphic light transmissive cover can include a holder member mounting an elongated panel member in an over center bias arrangement to cause the panel member to be either open or closed for engaging the replaceable sign member or graphic cover member. A support member can be attached to a holder member to position an array of light emitting diodes (LEDs) at a position offset from a back frame member. The light emitting diodes can be mounted on an elongated strip which in turn is attached to the support member.

A transparent backlight panel or panels can be connected to the holder member beneath the array of LEDs to optically couple with the emitted light and to conduct light within the backlight panel. The backlight panel member can secure the removable graphic cover or sign member against the backlight panel to illuminate the replaceable sign or graphic cover, whereby a light module for lighting a removable graphic cover or sign is provided.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE PREFERRED EMBODIMENTS

Reference will now be made in detail to the preferred embodiments of the invention which set forth the best modes contemplated to carry out the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
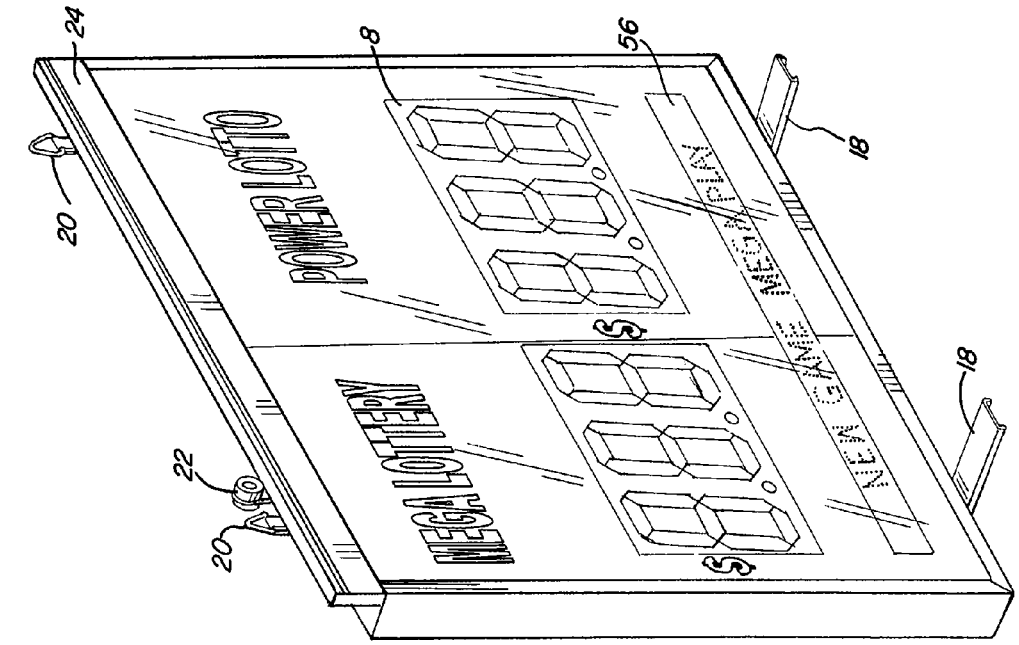
FIG. 1 is a perspective view of an illuminated sign embodiment in the form of a lottery sign.

Referring to FIG. 1, an illuminated sign 2 is shown in a perspective view and has been subjectively configured to provide viewer information on the total sums that can be won for respectively a Mega Lottery game and a Power Lotto game. A removable light transmissible graphic panel 4 of plastic has the terms "Mega Lottery" and "Power Lotto" printed on the rear surface of the flexible graphic panel 4 and then covered, by printing, with a diffusion ink to distribute the LED light in a uniform manner. As can be appreciated, additional information such as symbols or icons can also be applied such as dollar symbols and an appropriate legend indicating, for example, the value of any numbers illuminated on the respective light emitting array 6 and light emitting array 8 can be placed beneath or above the respective light emitting arrays such as the term "Million."

Preferably, the graphic panel 4 is a single flexible sheet of plastic material of 0.1 cm or less in thickness, with a relatively clear rectangular panel or window segment sections permitting a display of the respective numbers by the light emitting arrays 6 and 8. The clear plastic panels 5 can be further coated on the back side of the graphic panel 4 with a color such as red 5, so that the lottery amounts that are provided on the respective light emitting arrays 6 and 8 can provide a more dramatic effect on a viewer.

The light emitting rays can be from a source of light emitting diodes (LEDs) formed into a seven segment array configuration to represent numbers 1 through 9 and 0, depending on which segment of LEDs are driven, as known in the art. Decimal places can also be illuminated. Various images and/or designs can be provided at a rear surface of the graphic panel 4 by printing or silkscreening to provide desired indicia and symbols while still being transmissive to a backlight to illuminate information on the graphic panel 4 surrounding the respective light emitting arrays 6 and 8.

Figure 3:
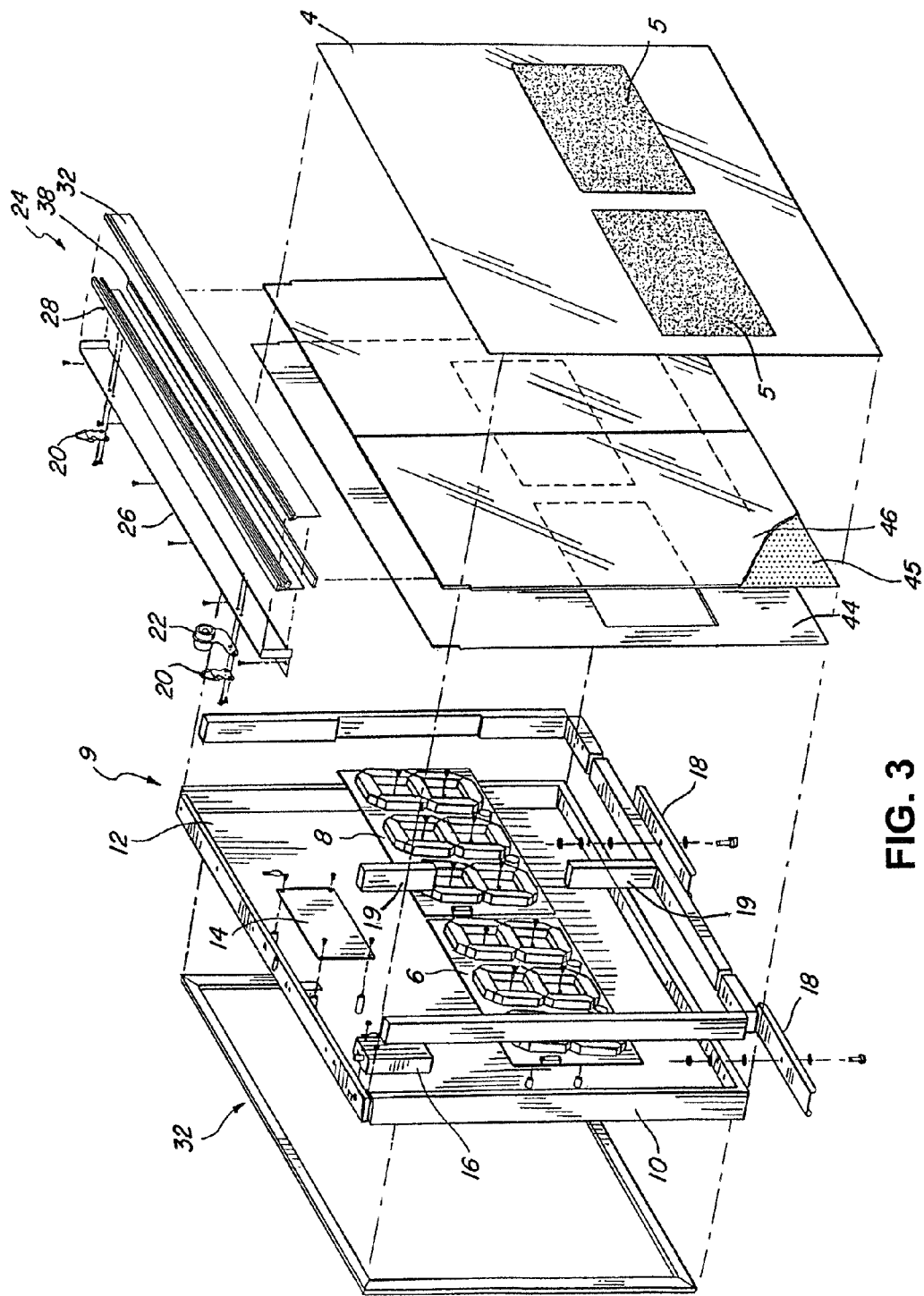
FIG. 3 is an exploded view of the embodiment of FIG. 1.

Reference can be made to an exploded view of FIG. 3 where a rectangular back frame 10 is formed, for example, from a metal sheet. A rear surface panel 12 is connected to the back frame 10 to form the main components of the housing unit 9. Respective light emitting arrays 6 and 8 with individual light emitting array segments can be mounted respectively on circuit boards with appropriate drive circuitry that can be connected to and controlled by a CPU control board 14 that is also mounted on the rear surface 12.

A wireless transceiver 16 in the form of a module is also mounted on the rear surface 12 of the housing unit. As known in radio technology, a transceiver is a device that can comprise both a transmitter and a receiver. Alternatively, a separate transmitter and a separate receiver could also be utilized. The wireless transceiver 16 enables radio communication to provide data to the CPU control board 14 such as the lottery jackpot sum which can be frequently updated on a daily basis by a central computer at the lottery control center, based on the number of people purchasing lottery tickets. The wireless transmission to the illuminated sign 2 enables freedom in locating the sign in a retail establishment.

Figure 2:
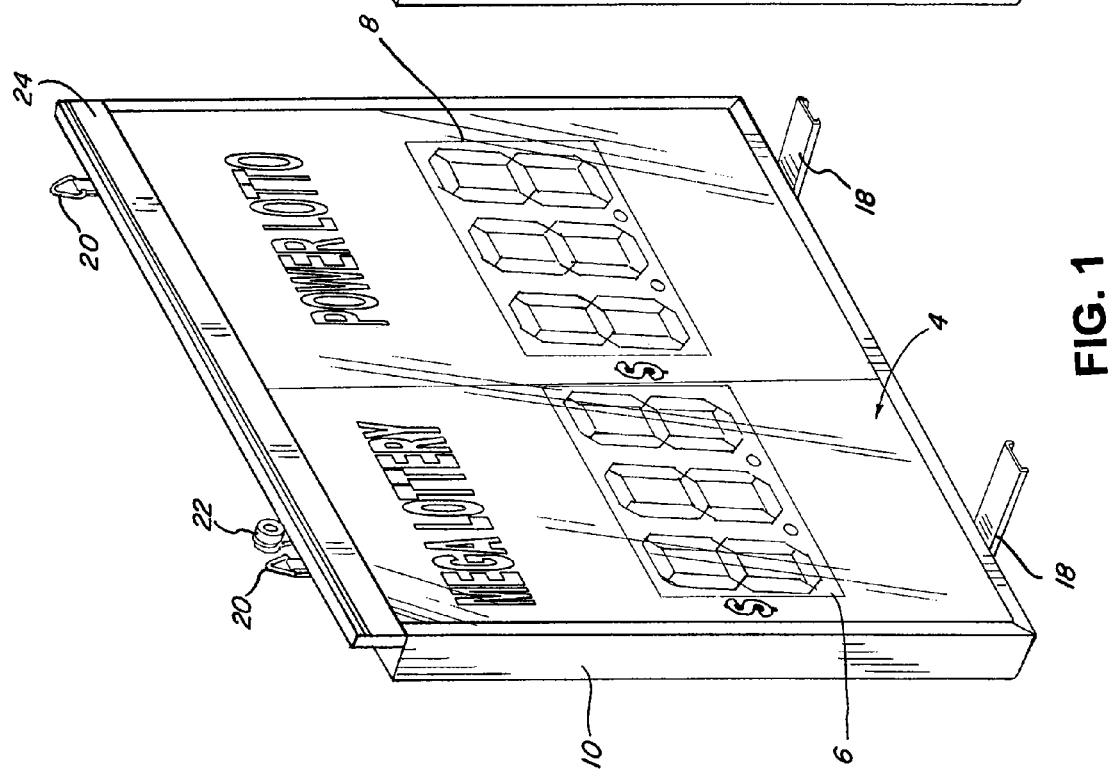
FIG. 2 is a perspective view of a second embodiment of the invention with a scrolling message feature.

A pair of rotatable support stands 18, each of a U-shaped metal plate are mounted at the bottom of the back frame 10 and can be rotated to be in line and parallel with the back frame 10 when the illuminated sign 2 is hung or suspended from a wall. FIGS. 1 and 2 show the support stands 18 rotated 90°, relative to the housing unit 9, to provide a stand alone support for the illuminated sign on a horizontal support surface.

Movable triangular hook members 20 can be mounted at the top of a mounting top bar 26 to facilitate hanging the illuminated sign 2, for example by a chain in the window of an establishment selling lottery tickets. A photo sensor 22 is mounted on the mounting top bar 26, for example, positioned on the top of the back frame 10 or at another appropriate location. See FIGS. 3 and 4. The photo sensor 22 is to monitor ambient light that contacts the front of the illuminated sign 2. As will be subsequently described, the photo sensor 22 and photo sensor circuit 23 can provide an output voltage signal to the CPU control board 14.

The back surface of rear surface member 12 can support additional advertisement sheets and can use a plurality of snap frame panels 32 extending about the rear perimeter in a similar manner as shown in FIG. 3. Accordingly, when the illuminated sign 2 is displayed in an exterior display window to attract lottery users, the internal rear facing portion of the illuminated sign can also display additional appropriate advertisements.

A backlight module 24 includes the mounting top bar 26 that can be screwed onto the top of the back frame 10. As can be seen, the movable triangular hook members 20 and the photo sensor 22 can be appropriately mounted to the mounting top bar member 26. The mounting top part 26 can be formed by bending a metal sheet and an edge light holder 28, formed from an aluminum extrusion, can be fastened to the front surface of the mounting top bar member 26 by appropriate screws that can also secure the movable triangular hook members 20 and on one side the photo sensor housing 22.

Figure 5:
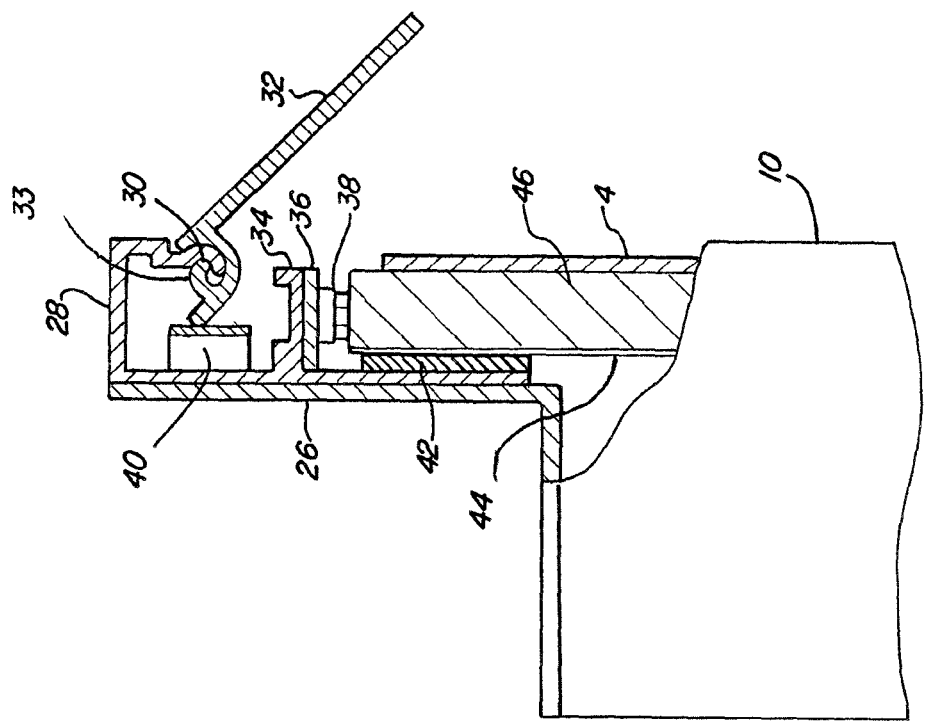
FIG. 5 is a side view with partial cross-sectional view with the panel member open.
Figure 4:
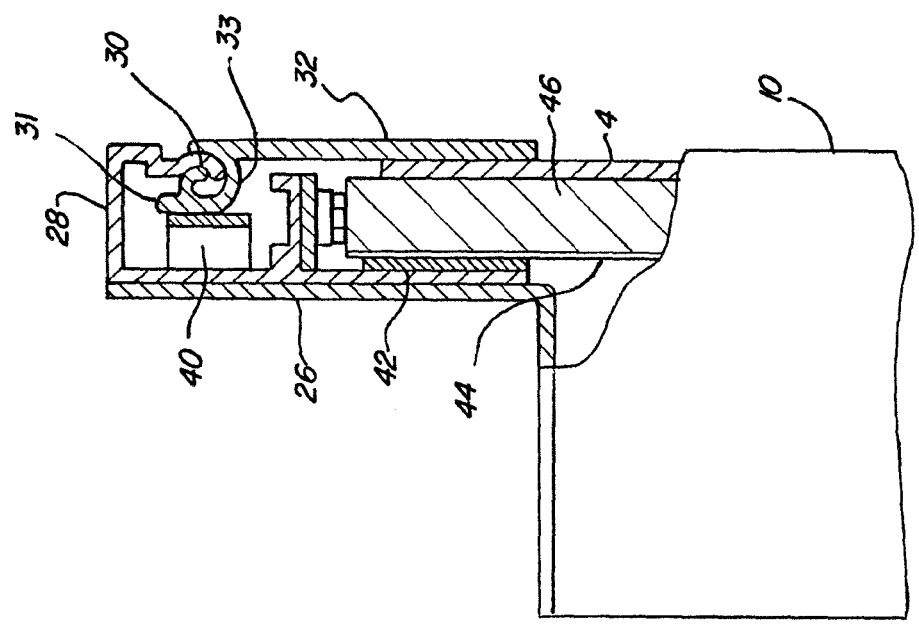
FIG. 4 is a side partial cross-sectional view of a light module for lighting a removable graphic cover of the panel member in a closed position.

The edge light holder 28 is formed by an aluminum extrusion process that includes a channel 30 with an overhanging lip that can mount an aluminum extruded snap frame panel 32 as shown in FIGS. 4 and 5. The edge light holder 28 also includes a cantilevered ledge member 34 that was integrally formed during the extrusion so that the underside surface of the ledge member 34 could provide a support member for an adhesive strip 36 that would secure a light emitting unit 38 such as an LED edge lit strip of an aligned array of LEDs on a supporting printed circuit board structure.

A spring member 40 provides an over center force bias on the snap frame panel with a curved hinge connector 33 so that it is biased open as shown in FIG. 5 or biased closed as shown in FIG. 4. A camming edge 31 of the snap frame panel 32 would be forced against the outer surface of the spring member 40 to create the over centered locations. The spring member 40 could be mechanical or have other configurations to facilitate the bias over centered positions.

An adhesive strip 42 is also attached to the edge light holder 28 to secure a reflecting backlight film sheet 44. The backlight film sheet 44 is formed from a thin acrylic sheet with a reflective coating.

FIG. 3 discloses a transparent relatively thick plastic backlight panel 46 that can be split into right and left hand segments to prevent light leakage between panel segments. Alternatively a large single piece backlight panel can be used. The top edge of the backlight panel is connected to LED light sources on the LED edge lip strip 38. The light is transmitted downward through the edge of the transparent backlight panel 46 to reflect from the appropriate parallel internal surfaces of the transparent backlight panel 46 by a dispersion section, such as an array of dispersion dots 45 printed on the rear surface of backlight panel 46 for reflecting any contact of the light from LED edge lip strip 38 outward through the front of the transparent backlight panel 46. Light reflected backward will be reflected back through the array of dots by the reflective coating on the film sheet 44. The reflected light travels through the graphic panel 4 which is held, as shown in FIG. 4, by the snap frame panel 32 against the front surface of the transparent backlight panel 46. Note, as shown in FIG. 3, lightweight spacers 19 such as Styrofoam blocks of various sizes can be inserted within the housing unit 9 to provide locational support for the transparent backlight panel 46.

Figure 6:
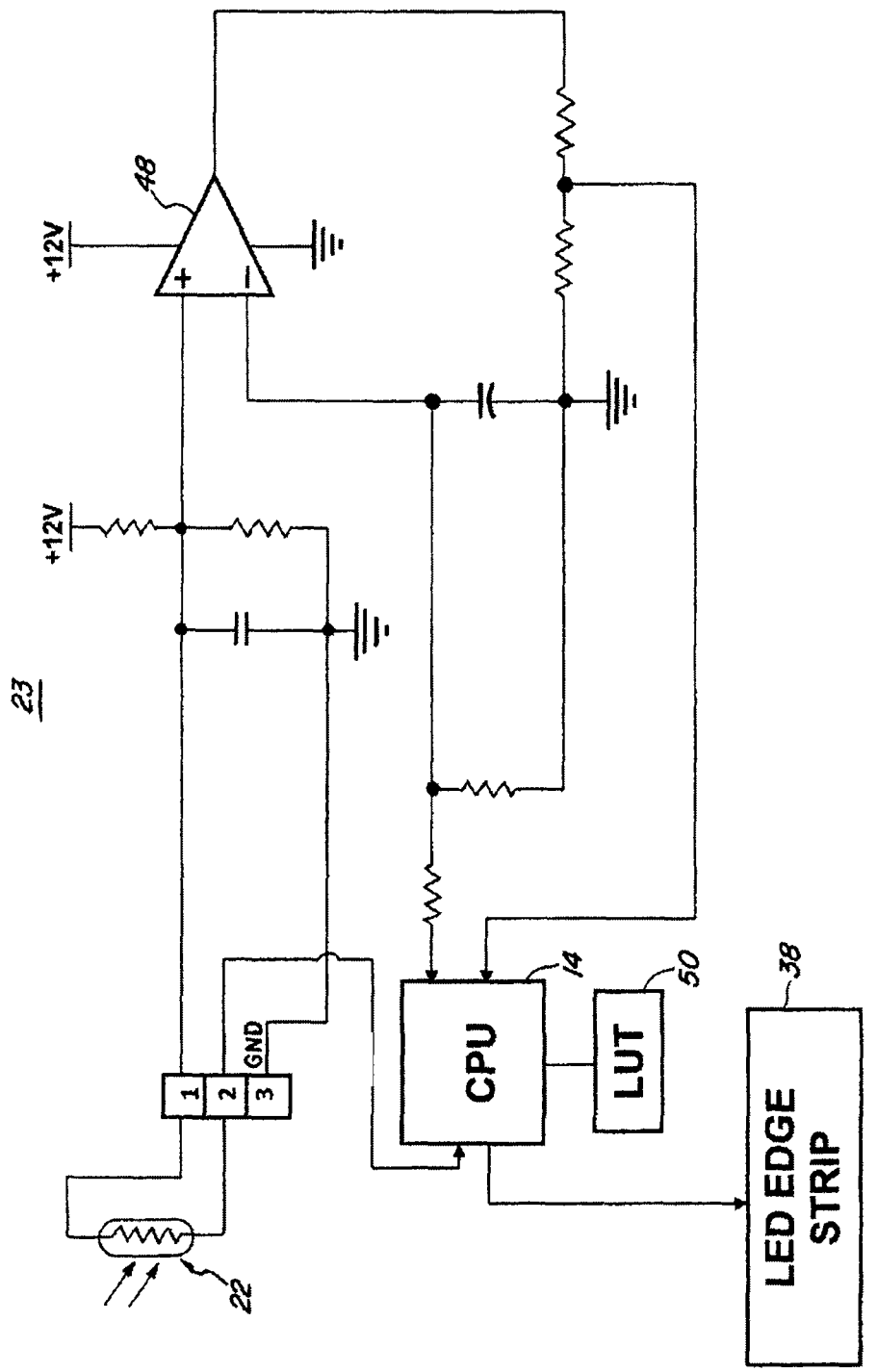
FIG. 6 is a schematic circuit of a light sensor and control unit.

Referring to FIG. 6, a schematic diagram of a photo sensor 22 and a photo sensor circuit 23 and its relationship with the CPU control board or control unit 14 is disclosed. Basically, the photo sensor 22 is excited by ambient light, such as the sun, and a series of resistors and capacitors enable a voltage signal to be applied to an anode side of an amplifier 48 where an amplified signal is generated to provide a voltage signal input into the CPU control board 14 representative of ambient light contacting the front of the illuminated sign 2.

In one embodiment, the CPU control board 14 can be programmed with software and/or firmware, including an EPROM, with an algorithm or as disclosed in FIG. 6, with a lookup table (LUT) 50 that permits the CPU control board or control unit 14 to match the ambient light voltage signal with a corresponding voltage output to drive the LED edge strip 38 and the light arrays 6 and 8 to provide an appropriate contrast illumination for the illuminated sign 2 in response to the ambient light. If a small voltage signal is produced, indicating a relatively dark ambient condition, the control unit 14 can then select from the lookup table 50 an appropriate voltage to provide an appropriate contrast to optimize the use of the voltage level power and the desired appearance of the illuminated sign 2 with backlighting.

In another embodiment, if the ambient light is relatively bright, greater than 3000 Lux, a larger voltage signal would cause the LED edge strip 38 to be turned off to conserve power, conversely, light below 3000 Lux will light the panel to provide an appropriate contrast to attract the viewers.

Figure 7:
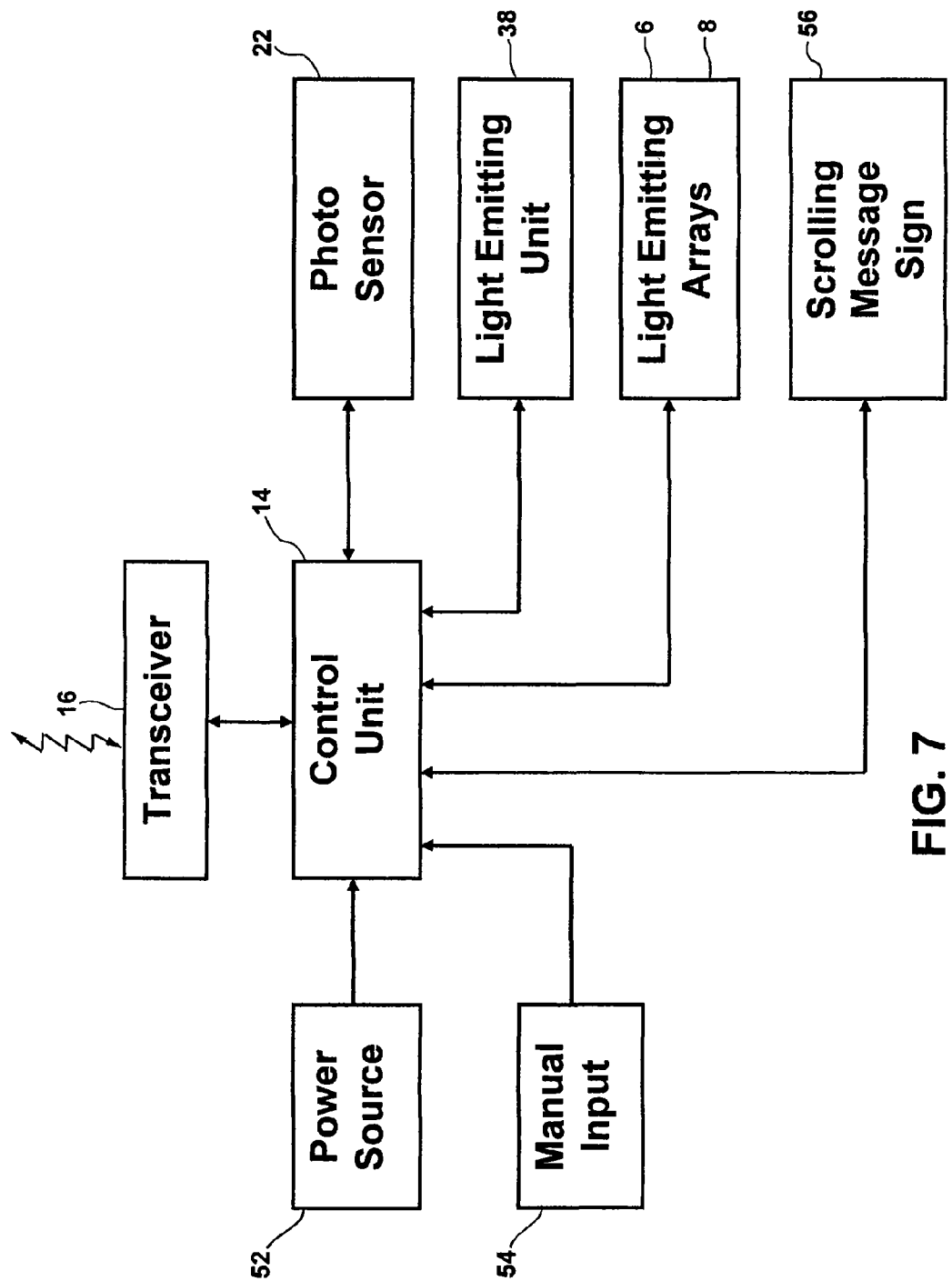
FIG. 7 is a schematic diagram of operating components of the second embodiment.

Referring to FIG. 7, a schematic overall control diagram is disclosed wherein the transceiver 16 can wirelessly receive a data signal indicative, for example, of drive information for disclosing respective numerical values of each jackpot as disclosed, for example, in FIGS. 1 and 2. As can be appreciated, data information may be sent to each retail store from a control center of the lottery headquarters and connected to the illuminated sign by wire or broadcast by a radio transmitter wirelessly to the transceiver 16 to control the display elements of the illuminated sign 2

The control unit 14 can be connected to a conventional AC electrical source and a transformer can provide a DC output.

For our purpose, the combination provides a power source 52 which can drive the light emitting unit or LED edge lip strip 38 to backlight the backlight module 24 to illuminate the graphic panel 4. Additionally, the control unit 14 can drive appropriate drive circuits associated with each of the light emitting arrays 6 and 8 to provide an appropriate numerical value for respectively the Mega Lottery and/or the Power Lotto from the power source 52. Alternatively, a manual input device 54 such as a keyboard or computer port connection can permit an operator to input drive signals including numerical values for the individual jackpots, directly into the control unit 14.

Note, appropriate power connections, universal ports, dip switches and/or on/off power switches can be mounted adjacent the light module 24. A power transformer, not shown, can convert 110 volt AC to 12 volt DC to power the LEDs. A dip switch can adjust the reception frequency of the transceiver 16 to prevent interference with any adjacent sign.

FIG. 7 also provides for a scrolling message sign 56 shown, for example, in the second embodiment of FIG. 2. As can be appreciated, again a transceiver 16 or a manual input 54 can provide information data to the control unit 14 that permits the composition of a scrolling message and a driving of a strip array of LEDs in either a black and white configuration or a multiple color configuration to provide information to attract a viewer's interest. For example, sports scores or topical events can be utilized to draw the user's attention to the illuminated sign 2 and thereby transfer the viewer's interest to that of potential winnings that could occur by purchasing an appropriate lotto ticket. An example of a type of scrolling message sign can be seen in U.S. Pat. No. 6,271,814, incorporated herein by reference.

Alternatively, the control unit 14 can implement a further embodiment of the present invention with the same photo sensor 22 and photo sensor circuit 23 of FIG. 6 based on only a measurement of greater than >3000 Lux or a measurement of less than <3000 Lux for two levels of ambient light that can drive alternative auto sensor modes in the environment of FIG. 7 as follows:

| | | Auto Sensor Mode | | | |
|---|---|---|---|---|---|
| | | Panel Lighting | | Digit Brightness | |
| Protocols | Functions | Day >3000 Lux | Night <3000 Lux | Day >1000 Lux | Night <1000 Lux |
| n = A Sensor ON auto detect | Auto Mode A | Off | On | Bright | Dim |
| n = B Sensor ON auto detect | Auto Mode B | On | On | Bright | Dim |

In Auto Mode A the LED edge strip 38 for backlighting the panel is either ON or OFF while the light emitting arrays 6 and 8 for providing numerical digital values of jackpots are either Bright or Dim. That is, Bright=approximately 12 mA while Dim=approximately 5 mA.

Thus, when the Lux value is lower than 3000 there is an activation to a night mode which activates the backlighting of the panel only on the Night setting. This Auto Mode A conserves the life of the LEDs on the edge strip 38 on the assumption that the panel will be adequately lit by reflection of ambient light by the array of reflection dots 45 on the back panel 46 and the reflective coating on the backlight film sheet 44.

In Auto Mode A, the digital light emitting arrays 6 and 8 will be activated to automatically be driven to a Bright state above 1000 Lux and will stay on Bright until a Dim state is provided below 1000 Lux.

In the Auto Mode B the sensor 22 will activate the panel lighting on at all time and keep it on at all times. Again, as in the Auto Mode A, the digital light emitting arrays 6 and 8 will be activated to automatically be driven to a Bright state above 1000 Lux until the sensor 22 senses lower than 1000 Lux and switches to Dim.

Possible manual switch settings for Day and Night as default settings when the Auto Sensor is disabled are as follows:

| | | Manual Mode | | | |
|---|---|---|---|---|---|
| | | Panel Lighting | | Digit Brightness | |
| Protocols | Functions | Day >3000 Lux | Night <3000 Lux | Day >1000 Lux | Night <1000 Lux |
| n = D Sensor OFF manual control | Manual Day Mode | Off | Off | Bright | Bright |
| n = N Sensor OFF manual control | Manual Night Mode | On | On | Dim | Dim |
| n = L Sensor OFF manual control | Auto Sensor Disabled | On | On | Bright | Bright |

An example of a software protocol for a lottery jackpot display with the photo sensor (auto sensor 22) is as follows:

NYL Lottery Jackpot Protocol V1.0
Account & ID Code
    A unique ACCOUNT CODE and UNIT ID(s) will be assigned.
XX=NY
nnnnnn=000001 is jackpot sign ID
L1=Left Line
L2=Right Line
2 Line Protocol Example
<PLNYLT<ID000001><AF><L1><FS>1.25<L2><FF>369<E>
Structure of Protocols
<PLNYLT><IDnnnnnn><##><Ln><F*>Data<E>
Description
< > are ASCII code 0X3C, 0X3E respectively.
<PLXXLT> packet header with account code identifier.
XX 2 characters of account code identifier. It can be alphanumeric.
For this project the code identifier is "NY"
<IDnnnnnn> unit ID number identifier, 6 numerical digits.
    ID are character "I" & "D" respectively.
    n is numerical value from 0 to 9.
<##> This function controls the photo sensor mode, the panels/digits brightness and effects.
    n=Photo Sensor Mode
    m=Panel brightness and effects

| <nm> | Effects |
|------|---------|
| n = A | Auto Sensor On - Energy Saving Mode |
| n = B | Auto Sensor On - Normal Energy Mode |
| n = D | Auto Sensor Off - Day Mode |
| n = N | Auto Sensor Off - Night Mode |
| n = L | Auto Sensor Off - All Display Set at Brightest Mode |
| m = A | L Panel: ON, R Panel: FLASH |
| m = B | L Panel: FLASH, R Panel: ON |
| m = C | L Panel: OFF, R Panel: FLASH |
| m = D | L Panel: FLASH, R Panel: OFF |
| m = E | Alternate FLASH Among Panels |
| m = F | All Panels FLASH |
| m = G | L Panel: ON, R Panel: OFF |
| m = H | L Panel: OFF, R Panel: ON |
| m = Y | All Panels ON |
| m = Z | All Panels OFF |

<Ln> specifies which line to update. L is ASCII character "L".
   n is a numeric value 1, 2, depending on number of lines on a sign.

<F*> Jackpot function.
   When the * is "S" means jackpot is static, "F" means jackpot is flash.

Data Corresponding 3 digit numbers and "B" with or without radix point "."

<E> end of packet. E is character "E".

Update Sign

Single Line:
   <PLNYLT><IDnnnnnn><##><L1><F*>Data<E>

2 Lines:
<PLNYLT><IDnnnnnn><##><L1><F*>Data1<L2>
   <F*>Data2<E>

Response From Sign

<IDnnnnnn><S> sign ID number nnnnnn successfully received transmission.

<IDnnnnnn><ER> sign ID number nnnnnn responded with transmission reception error.

Broadcast Mode
   <ID******>
   Can be used for single line or multiple line update.
   Example:
      <PLNYLT><ID******><##><Ln><F*>Data<E>
   Broadcast transmission will be accepted by all units.
   Broadcast transmission will not trigger acknowledgement response from signs.

Groupcast Mode
   <ID10**>, <ID111*>
   Can be used for single line or multiple line update.
   Example:
      <PLNYLT><ID10****><##><Ln><F*>Data<E>
   Groupcast transmission will be accepted by a given group.
   Sign group 100000~109999 use <ID10****>
   Sign group 111000~111999 use <ID111***>
   Groupcast transmission will not trigger acknowledgement response from signs.

Read Back Jackpot Amount
   <PLNYLT><IDnnnnnn><Ln><R><E>
   The sign that matches the ID number will respond with its own ID number followed by data.
   Response: <IDnnnnnn>Data<S>
   Error response: <IDnnnnnn><ER>

Read Back ESN
   ONLY one sign's ESN can be read back at a time.
   <PLNYLT><IDnnnnnn><ESN><E>
   Response: <IDnnnnnn>NYLDJP2011-#####<S>

Read Back ID
   ONLY one sign's ID can be read back at a time. This means only a single sign should be powered on.
   <PLNYLT><ID******><Ln><R><E>
   Response: <IDnnnnnn><S>

CHANGE ID (The CHANGE ID function is only valid within 30 seconds after booting)
   ONLY one sign's ID can be changed at a time.
   <PLNYLT><IDnnnnnn><MID><IDyyyyyy><E>
   where nnnnnn is the old ID and yyyyyy is the new ID.
   Change accepted response: <IDyyyyyy><S>
   Error response: <IDnnnnnn><ER> or no response at all.

Change Timeout Setting
   ONLY one sign's TIMEOUT setting can be changed at a time.
   <PLNYLT><IDnnnnnn><T>hh:mm<E>
   Range of hh is from 00 to 24, range of mm is from 00 to 59. Minimum timeout is 00:01 and Maximum timeout is 24:00.
   Change accepted response: <IDnnnnnn><S>
   Error response: <IDnnnnnn><ER> or no response at all.

Restart Jackpot Sign
   Must sure the IDnnnnnn is only.
   <PLOLLT><IDnnnnnn><RST><E>
   Change accepted response: <IDnnnnnn><S>
   Error response: <IDnnnnnn><ER> or no response at all.

Read Firmware Version
   Must sure the IDnnnnnn is only.
   <PLNYLT><IDnnnnnn><FIRM><E>
   Response: <IDnnnnnn>NYL:V#.#<S>

Response Time from Sign
   Less than 500 ms

Communication Settings
   Baud Rate: 9600 bps
   Data Bits: 8
   Parity: None
   Stop Bits: 1
   Flow Control: None Software Implementation Notes
   Software should check for acknowledgement from the sign.
   Data is NOT properly received if:
      1. An error code is sent back from the sign.
      2. No response from the sign after 500 ms.

Sample Displays

| MESSAGE | DISPLAY |
|---------|---------|
| <PLNYLT><IDnnnnnn><##><Ln><F*>123<E> | 123 |
| <PLNYLT><IDnnnnnn><##><Ln><F*>4.56<E> | 4.56 |
| <PLNYLT><IDnnnnnn><##><Ln><F*>78.9<E> | 78.9 |
| <PLNYLT><IDnnnnnn><##><Ln><F*>B.78<E> | .78 |
| <PLNYLT><IDnnnnnn><##><Ln><F*>B90<E> | 90 |
| <PLNYLT><IDnnnnnn><##><Ln><F*>BB.2<E> | .2 |

Sign ID Examples

| Sign Number | ASCII |
|-------------|-------|
| 1 | <ID000001> |
| 2 | <ID000002> |
| 3 | <ID000003> |

Group ID Examples

| Sign Number | ASCII |
|---|---|
| Sign 100000~199999 | <ID1*****> |
| Sign 111000~111999 | <ID111***> |
| All Signs | <ID******> |

ASCII to Hexadecimal Table

| ASCII | 0 | 1 | 2 | 3 | 4 | 5 | 6 | 7 | 8 | 9 | B | . |
|---|---|---|---|---|---|---|---|---|---|---|---|---|
| Hex | 30 | 31 | 32 | 33 | 34 | 35 | 36 | 37 | 38 | 39 | 42 | 2E |
| DISPLAY | 0 | 1 | 2 | 3 | 4 | 5 | 6 | 7 | 8 | 9 | | . |

In summary, a relatively economical thin and lightweight illuminated sign 2 is provided that can be both hung on a wall or in a display window or alternatively, supported on a horizontal support space with a capacity to provide a backlight module 24 for lighting a removable graphic panel 4. A pair of LED arrays 6, 8 is capable of providing numerical information such as the value of lottery games. The light module 24 is mounted on a back frame 10 and can suspend different graphic panels 4 on an exterior surface of the illuminated sign depending on the lottery games being offered.

Figure 8:
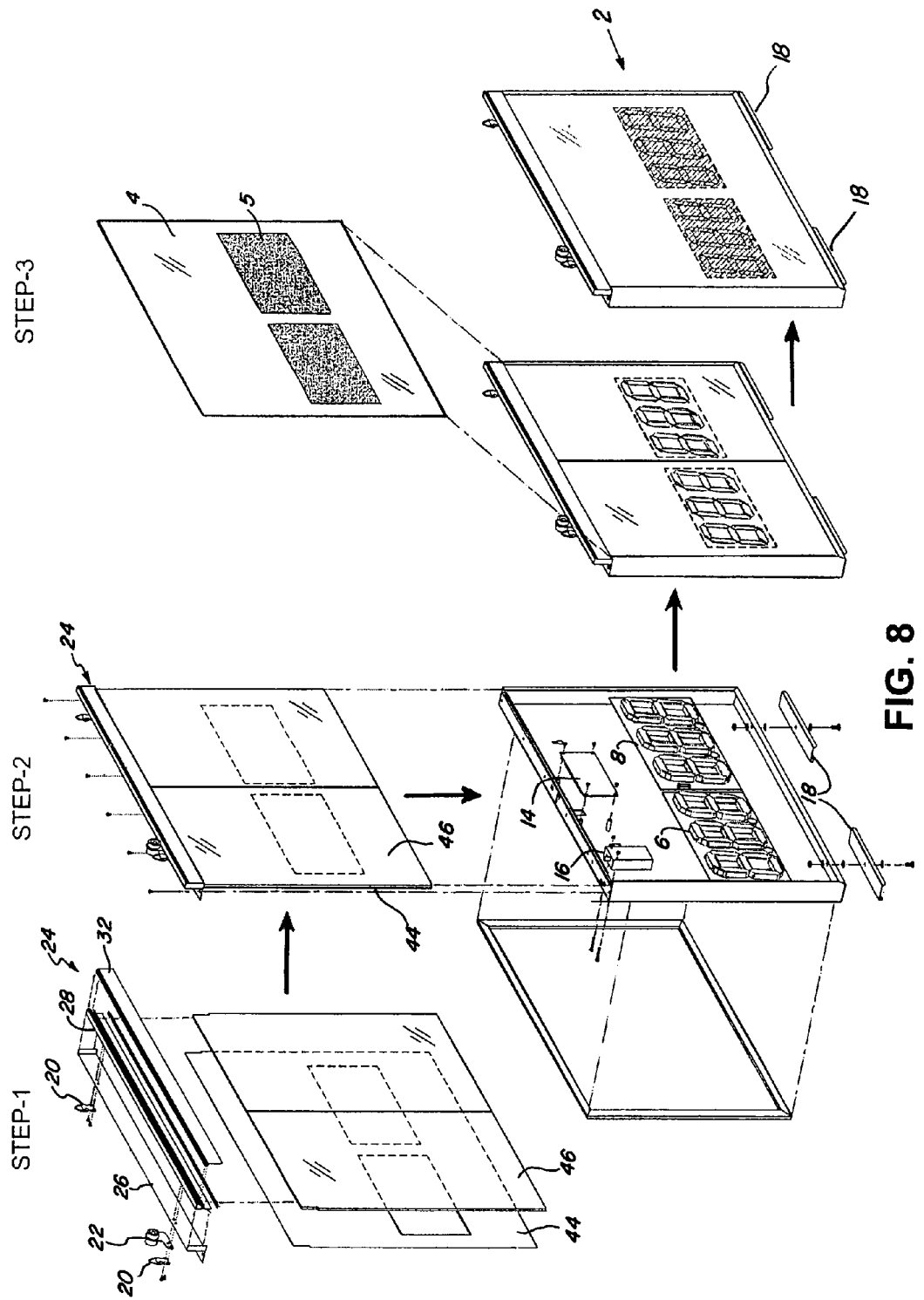
FIG. 8 is a schematic of assembly steps of the illuminated sign.

Referring to FIG. 8, as shown in step 1, a backlight module 24 can be assembled with a thin reflective backlight film sheet 44 pressed against a vertical rear surface of a transparent plastic backlight panel 46. As shown in step 2, the backlight module 24 can then be assembled onto the frame of housing unit 9 with the respective lighting arrays 6 and 8. The transparent panels 5 can be clear or have an attractive color such as red, to be aligned over the respective light emitting arrays 6 and 8. In the final assembly step 3, replaceable sign member or graphic panel 4 is disclosed as being arranged to slide downward across the face of the transparent backlight panel 46 or pair of panels 46 with the vertical side edges and bottom edges of the frame 10 holding the graphic panel 4 in place.

The top snap frame panel 32 captures a top horizontal edge of the graphic panel 4, so that the graphic panel 4 can be replaced with another graphic panel to change both the basic display symbols and meet the requirements of any particular lottery game. In FIG. 8, the illuminated sign 2 is disclosed with the rotatable stands 18 positioned in a retracted mode for suspending the illuminated sign 2 in a window or hanging the illuminated sign 2 on a wall. When the pair of rotatable stands 18 are rotated at 90° from the position shown in FIG. 8, the illuminated sign 2 can be supported on a horizontal surface.

As can be appreciated, the illuminated sign 2 can be easily repaired to replace defective light emitting arrays 6 and 8 along with regards to any burnout LEDs on the edge light strip 38. Thus, an economical and versatile lightweight illuminated sign 2 is provided that can automatically adjust the contrast of the illumination of the sign 2 relative to any ambient light environment.

Those skilled in the art will appreciate that various adaptations and modifications of the just-described preferred embodiment can be configured without departing from the scope and spirit of the invention. Therefore, it is to be understood that, within the scope of the amended claims, the invention may be practiced other than as specifically described herein.

What is claimed is:

1. An illuminated sign comprising:
a housing unit;
a light emitting array of light emitting diodes (LEDs) are mounted in a rear of the housing unit and configured to provide visible indicia of at least numerals to a user through the housing unit;
a light emitting unit of LEDs mounted on the housing unit to emit light across at least a first side of the housing unit that is positioned adjacent and in front of the light emitting array;
a transparent backlight panel extending across the first side to receive light from the light emitting unit LEDs through a side edge of the backlight panel, the transparent backlight panel includes an array of dispersion dots on a rear surface for reflecting any contact of the light received from the LEDs through the side edge outward through a front of the transparent backlight panel, the array of dispersion dots are spaced to also permit the visible indicia of numerals to pass through the array of dots and extend outward through the front of the transparent backlight panel;
a reflection section positioned in contact with the transparent backlight panel and beneath the light emitting unit to redirect any light from the light emitting unit extending rearwardly through the transparent backlight panel to provide a backlight, having an opening aligned with the light emitting array of visible indicia of numerals to allow the visible indicia of numerals to enter the transparent backlight panel and exit to the front of the transparent backlight panel; and
a replaceable sign member with visible indicia configured to be backlit by the light from the light emitting unit of LEDs and to accommodate a combined display of the visible indicia of numerals and the replaceable sign member visible indicia to a user.

2. The illuminated sign of claim 1 further including an over center biased snap frame panel unit mounted by a hinge connector across an upper surface of the housing unit for securing the replaceable sign member.

3. The illuminated sign of claim 1 further including a light sensor assembly for measuring ambient light and adjusting an output of light from the light emitting unit to provide a predetermined contrast with ambient light.

4. The illuminated sign of claim 1 further including a wireless transceiver for receiving electronic data mounted in the housing unit for providing a display.

5. The illuminated sign of claim 1 further including a scrolling message sign unit mounted in the housing unit.

6. The illuminated sign of claim 1 further including a rotatable stand member mounted on the housing unit.

7. The illuminated sign of claim 1 further including an over center biased panel mounted by a hinge connector across a side of the rear of the housing unit.

8. The illuminated sign of claim 1 further including a removable backlight module for connecting the light emitting unit, transparent backlight panel, reflection section and replaceable sign member as one component for mounting on the housing unit.

9. The illuminated sign of claim 8 further including a light sensor for receiving ambient light mounted on the backlight module.

10. The illuminated sign of claim 8 further including an over center biased snap frame panel unit mounted on the housing unit for supporting a sheet of indicia on a rear of the housing unit.

11. An illuminated sign comprising:
a compact housing unit formed from a metal sheet includes a rectangular back frame and a rear surface panel of a configuration to stand upright from a horizontal support surface and also to hang as a display in a window;
a light emitting array of light emitting diodes (LEDs) are mounted on the rear surface panel of the housing unit and configured to provide visible indicia to a user of at least numerals to a user through the housing unit;
a light emitting unit of LEDs mounted on the housing unit to emit light across at least a first side of the housing unit that is positioned adjacent and in front of the light emitting array;
a transparent backlight panel extending across the first side to receive light from the light emitting unit LEDs through a side edge of the backlight panel, the transparent backlight panel includes an array of dispersion dots on a rear surface for reflecting any contact of the light received from the LEDs through the side edge outward through a front of the transparent backlight panel the array of dispersion dots are spaced to also permit the visible indicia of numerals to pass through the array of dots and extend outward through the front of the transparent backlight panel;
a reflection section positioned in contact with the transparent backlight panels and beneath the light emitting unit to redirect the light from the light emitting unit extending rearwardly through the transparent backlight panel to provide backlight, having an opening aligned with the light emitting array visible indicia of numerals to allow the visible indicia of numerals to enter the transparent backlight panel and exit to the rear;
a control unit having a processor configured to be connected to and drive the light emitting unit to emit light on an edge of the transparent backlight panel wherein the reflection section can direct light from the housing unit, the processor is connected to the light emitting array to activate a specific visible indicia of numerals from the light emitting array; and
a replaceable sign member with visible indicia configured to be backlit by the light from the light emitting unit and to accommodate a combined display of the visible indicia of numerals and the replaceable sign member visible indicia to a user.

12. The illuminated sign of claim 11 further including a transceiver for receiving electronic data and transmitting the electronic data to the control unit for setting the specific visible indicia to be displayed by the light emitting array.

13. The illuminated sign of claim 12 wherein the transceiver is wireless and mounted on the housing unit to provide a wireless link to the control unit for setting the specific visible indicia to update a lottery jackpot number.

14. The illuminated sign of claim 12 further including a scrolling message sign unit mounted in the housing unit and driven by the control unit to provide a scrolling word and/or symbol message received by the transceiver to the user.

15. The illuminated sign of claim 11 further including a light sensor assembly for measuring ambient light directed towards the sign from an environment surrounding the location of the illuminated sign, the light sensor assembly is connected to the control unit for adjusting an output of light from the light emitting unit to provide a predetermined contrast with ambient light.

16. In an illuminated sign, having a frame member and a light emitting array of light emitting diodes LEDs configured to provide visible indicia of at least numerals mounted on the frame member, the improvement of a backlight module for lighting a removable sign member with visible indicia positioned in front of the light emitting array of LEDs, comprising:
a mounting top bar;
a single frame panel member mounted on the top bar and having an over center bias to cause the single frame panel member to be either open or closed;
a support member attached to the top bar to position a light emitting unit of light emitting diodes (LEDs) at a position offset from the top bar; and
a transparent backlight panel connected to the top bar beneath the light emitting unit of LEDs to optically couple with the emitted light of the LEDs and conduct the light within the transparent backlight panel, wherein the panel member can secure the removable sign member against the transparent backlight panel to illuminate the visible indicia of the removable sign member, wherein
the transparent backlight panel extends across a front side of the frame member to receive light from the light emitting LEDs through a side edge of the backlight panel, the transparent backlight panel includes an array of dispersion dots on a rear surface for reflecting any contact of the light received from the light emitting unit LEDs through the side edge outward through a front of the transparent backlight panel, the array of dispersion dots are spaced to also permit the visible indicia of numerals from the light emitting array of LEDs to pass through the array of dots and extend outward through the front of the transparent backlight panel to provide a combined display of the replaceable sign member visible indicia and the visible indicia of the numerals to a user.

17. The illuminated sign of claim 16 further including a light sensor for measuring ambient light mounted on the backlight module and a control unit connected to the light sensor to enable an automatic adjustment of an output of light from the array of LEDs.

18. The illuminated sign of claim 17 further including hook members mounted on the backlight module to enable support for suspension of the illuminated sign as a display sign.

19. The illuminated sign of claim 17 further including an over center biased snap frame panel mounted on the frame member to vertically suspend the transparent backlight panel, the removable sign member and a reflection section positioned in contact with the transparent backlight panels and beneath the light emitting unit to redirect the light from the light emitting unit extending rearwardly through the transparent backlight panel to provide a backlight, the reflection section having an opening aligned with the light emitting array of visible indicia of numerals to allow the visible indicia of numerals to enter the transparent backlight panel and exit to the front of the transparent backlight panel to provide the combined display of visible numerals and visible indicia from the removable sign member.

* * * * *